US009805014B2

(12) United States Patent
Ramakrishnan et al.

(10) Patent No.: US 9,805,014 B2
(45) Date of Patent: Oct. 31, 2017

(54) METHODS AND SYSTEMS FOR FACILITATING TRUSTED FORM PROCESSING

(71) Applicant: Xerox Corporation, Norwalk, CT (US)

(72) Inventors: Archana Ramakrishnan, Bangalore (IN); Deepthi Chander, Cochin (IN); Kuldeep Yadav, Gurgaon (IN); Kovendhan Ponnavaikko, Chennai (IN); Koustuv Dasgupta, Bangalore (IN); Nischal Murthy Piratla, Freemont, CA (US)

(73) Assignee: Xerox Corporation, Norwalk, CT (US)

( * ) Notice: Subject to any disclaimer, the term of this patent is extended or adjusted under 35 U.S.C. 154(b) by 347 days.

(21) Appl. No.: 14/470,974

(22) Filed: Aug. 28, 2014

(65) Prior Publication Data
US 2016/0062972 A1  Mar. 3, 2016

(51) Int. Cl.
*G06F 17/00* (2006.01)
*G06F 17/24* (2006.01)
(Continued)

(52) U.S. Cl.
CPC .......... *G06F 17/243* (2013.01); *G06F 17/248* (2013.01); *G06Q 40/02* (2013.01);
(Continued)

(58) Field of Classification Search
CPC .. G06F 17/30011; G06Q 40/02; G06Q 10/10; G06Q 30/04; G06Q 30/06; G06Q 20/04; G06Q 20/02; G06Q 20/10; H04L 63/08
(Continued)

(56) References Cited

U.S. PATENT DOCUMENTS

2001/0011250 A1* 8/2001 Paltenghe ........... G06F 21/6209
                                                              705/41
2002/0156846 A1* 10/2002 Rawat ................... G06F 17/243
                                                              709/203
(Continued)

OTHER PUBLICATIONS

Evgeniou, et al; "Regularized Multi-Task Learning"; in KDD 2004 (2004), pp. 109-117.
Argyriou et al; "A spectral Regularization Framework for Multi-Task Structure Learning"; pp. 1-8.
Agarwal et al; "Learning Multiple Tasks using Manifold Regularization"; pp. 1-9.
(Continued)

*Primary Examiner* — Quoc A Tran
(74) *Attorney, Agent, or Firm* — Philip E. Blair; Fleit Gibbons Gutman Bongini & Bianco P.L.

(57) ABSTRACT

A method for facilitating trusted processing of multiple forms for use with a document banking system, comprising: receiving a selection of an Auto-fill option and a form from a computing device, an account holder selects the Auto-fill option, the form including fillable field(s); authenticating the account holder based on login credential(s), the account holder has a document banking account including documents within the banking system; searching a form template for the form in the banking system, the form template including at least one fillable field similar to the fillable fields of the form; extracting a value corresponding to the at least one fillable field, the value being extracted from the document(s) of the account holder; and filling the form by overlaying the extracted value on the fillable field(s) of the form, the filled form being displayed along with a status information for the fillable field(s) at the computing device.

6 Claims, 9 Drawing Sheets

(51) Int. Cl.
*G06Q 40/02* (2012.01)
*G06Q 20/04* (2012.01)
*G06Q 30/06* (2012.01)
*G06Q 20/02* (2012.01)
*G06Q 10/10* (2012.01)
*G06F 17/30* (2006.01)
*G06Q 30/04* (2012.01)
*G06Q 20/10* (2012.01)
*H04L 29/06* (2006.01)

(52) U.S. Cl.
CPC ........ *G06F 17/30011* (2013.01); *G06Q 10/10* (2013.01); *G06Q 20/02* (2013.01); *G06Q 20/04* (2013.01); *G06Q 20/10* (2013.01); *G06Q 30/04* (2013.01); *G06Q 30/06* (2013.01); *H04L 63/08* (2013.01)

(58) Field of Classification Search
USPC .................................................. 715/221–225
See application file for complete search history.

(56) References Cited

U.S. PATENT DOCUMENTS

2005/0289182 A1* 12/2005 Pandian .................. G06Q 10/10
2010/0251092 A1* 9/2010 Sun ....................... G06F 17/243
715/222

OTHER PUBLICATIONS

Belkin et al; "Maniford Regularization" A Geometric Framework for Learning from Labeled and Unlabeled Examples Journal of Machine Learning Research 7 (2006) pp. 2399-2434.
Jacob et al; "Clustered Multi-Task Learning: a Convex Formulation"; pp. 1-8.
Daume III, Hal' Bayesian Multitask Learning with Latent Hierarchies; pp. 1-8.
Tjong Kim Sang, et al' Introduction to the CoNLL-2000 Shared Task : Chunking ; Proceedings of CoNLL-2000 and LLL-2000, pp. 127-132, Lisbon, Portugal, 2000.
Sutton et al; "Dynamic Conditional Random Fields: Factorized Probabilistic Models for Labeling and Segmenting Sequence Data"; pp. 1-8.
Yu et al; "Learning Gaussian Processes from Multiple Tasks"; pp. 1-8.
Schwaighofer, et al; "Learning Gaussian Process Kernels via Hierarchical Bayes"; pp. 1-8.
Liu, et al; "Semi-Supervised Multitask Learning"; pp. 1-8.
Evgeniou, et al; "Learning Multiple Tasks with Kernel Methods"; Journal of Machine Learning Research 6 (2005), pp. 615-637.
Xue, et al; "Multi-Task Learning for Classification with Dirichlet Process Priors"; Journal of Machine Learning Research 8 (2007); pp. 35-63.
Caruana, Rich; "Multitask Learning"; pp. 1-35.

\* cited by examiner

FIG. 5

```xml
-<Form name="XYZForm" formWidth="1400" formHeight="2100">
 -
  -<definition>
    <field id="1" name="FirstApplication:DOB:date" x="794" y="479" width="49" height="32"/>
    <field id="2" name="FirstApplication:DOB:month" x="853" y="479" width="68" height="32"/>
    <field id="3" name="FirstApplication:DOB:year" x="915" y="479" width="120" height="32"/>
    <field id="4" name="ApplicationDate" x="1096" y="218" threshold="240" width="50" height="30"/>
    <field id="5" name="FirstApplication:Name" x="230" y="325" width="1115" height="30"/>
    <field id="6" name="FirstApplication:Male" x="1185" y="470" width="40" height="32"/>
    <field id="7" name="FirstApplication:Female" x="1231" y="470" width="40" height="32"/>
    <field id="8" name="FirstApplication:Pan" x="148" y="625" width="277" height="35"/>
    <field id="9" name="FirstApplication:Form60" x="575" y="622" width="28" height="34"/>
    <field id="10" name="MailingAddress:BuildingName" x="215" y="835" threshold="250" width="960" height="30"/>
    <field id="11" name="MailingAddress:RoadNo_Name" x="215" y="868" threshold="250" width="960" height="30"/>
    <field id="12" name="MailingAddress:Landmark" x="215" y="902" width="460" height="30"/>
    <field id="13" name="MailingAddress:City" x="215" y="935" width="550" height="30"/>
    <field id="14" name="MailingAddress:PinCode" x="872" y="931" width="156" height="30"/>
    <field id="15" name="MailingAddress:State" x="215" y="966" width="550" height="30"/>
    <field id="16" name="MailingAddress:Telephone_Office" x="215" y="1000" width="220" height="30"/>
    <field id="17" name="MailingAddress:Telephone_Residence" x="950" y="1000" width="220" height="30"/>
  -<definition>
 -<rulesDef>
   -<rule id="1" type="default" error="FirstApplication:DOB:date is invalid">
       <param>1</param>
       <param>249</param>
     </rule>
   -<rule id="2" type="default" error="FirstApplication:DOB:month is invalid">
       <param>2</param>
       <param>234</param>
     </rule>
   -<rule id="3" type="default" error="FirstApplication:DOB:year is invalid">
       <param>3</param>
       <param>234</param>
     </rule>
   -<rule id="4" type="atleastone" error="FirstApplication:PAN/Form60 is invalid">
       <param>8,9</param>
     </rule>
   -<rule id="5" type="onlyone" error="FirstApplication:Gender is invalid">
       <param>6,7</param>
     </rule>
   -<rule id="6" type="allMandatory" error="FirstApplication:DOB is invalid">
       <param>1,2,3</param>
     </rule>
   -<rule id="7" type="mandatoryiftrue" error="Permanent Address is invalid">
       <param>15</param>
       <param>16,17,18,19</param>
   -<rule id="8" type="mandatoryiffalse" error="Communication Address is invalid">
       <param>25</param>
       <param>26,27,28,29</param>
     </rule>
   -<rule id="9" type="optioniftrue" error="Communication Address is invalid">
       <param>35</param>
       <param>36,37,38,39</param>
     </rule>
   -<rule id="10" type="optionaliffalse" error="Communication Address is invalid">
       <param>31</param>
       <param>32,33</param>
     </rule>
   <Rules>
  <rulesDef>

</Form>
```

| PANcard Registration FormBrowser | | – □ X |
|---|---|---|
| https//tin.tin.nsdl.com/pan2/sen/et/NewPanApp | | Auto-Fill |
| 1.Full Name (Initials are not permitted in first and last name) | | |
| Title Snt./Mr.○ Snt./Mrs.○ Snt./Ms.○ M's. | | |

Last Name/Surname    First Name    Middle Name

2.Name you would like printed on the card

3.Have you ever been known by any other names? Yes○ No○
If yes, please give that other name (initials are not permitted in first and last name)
Title Snt./Mr.○ Snt./Mrs.○ Snt./Ms.○ M's.

Last Name/Surname    First Name    Middle Name

| 4.Gender | Male○ Female○ |
|---|---|
| 5.Date of Birth/Incorporation/Agreement Partnership or Trust Deed Formation of Body of Individuals/Association of Persons | DD MM YYYY |

6.Father's Name (Even married women should put father's name on)
Last Name/Surname    First Name    Middle Name 6.Address
(R) Residential Address

| Flat Door Block No. | |
| Name of Premises/Building Village | |
| Road Street/Lane/Post Office | |
| Area/Locally/Tal/Sub-Division | |
| Town/City/District | |
| State/Union Territory | -Please select- ▼ |
| Pin (indicating PIN is mandatory) | |
| Country | -Please select- ▼ |
| Zip | |

PANcard Registration FormBrowser https//tin.tin.nsdl.com/pan2/sen/et/NewPanApp

1. Full Name (Initials are not permitted in first and last name)    Auto-Fill
Title Snt./Mr.● Snt./Mrs.○ Snt./Ms.○ M's.

| Last Name/Surname | First Name | Middle Name |
|---|---|---|
| Mondal ✓ | Anriban ✓ | K |

2. Name you would like printed on the card

Anriban Mondal ✓

3. Have you ever been known by any other names? Yes○ No●
If yes, please give that other name (initials are not permitted in first and last name)
Title Snt./Mr.○ Snt./Mrs.○ Snt./Ms.○ M's.

| Last Name/Surname | First Name | Middle Name |
|---|---|---|
|  |  |  |

4. Gender — Male● Female○ ✓

5. Date of Birth/Incorporation/Agreement Partnership or Trust Deed Formation of Body of Individuals/Association of Persons — DD MM YYYY — 12 SEP 1975 ✓ — 712

6. Father's Name (Even married women should put father's name on)

| Last Name/Surname | First Name | Middle Name |
|---|---|---|
| Mondal ✓ | Anriban ✓ | K ✓ |

6. Address
(R) Residential Address

| Flat Door Block No. | Flat No 87 ✗ — 712 |
|---|---|
| Name of Premises/Building Village | ABC Villas |
| Road Street/Lane/Post Office | Outer Ring Road ✗ |
| Area/Locally/Tal/Sub-Division | Duchland |
| Town/City/District | Banglore ✗ |
| State/Union Territory | Kansas |
| Pin (indicating PIN is mandatory) | 737132 |
| Country | -Please select- |
| Zip |  |

METHODS AND SYSTEMS FOR FACILITATING TRUSTED FORM PROCESSING

TECHNICAL FIELD

The presently disclosed embodiments relate to document banking, and more particularly to methods and systems for facilitating trusted form processing.

BACKGROUND

Consumers are often required to submit a significant number of documents to organizations for various reasons, such as for purchasing services, submitting applications, etc. These documents are not available in a single central repository, and instead are typically in paper form or in stored electronic repositories, such as consumers' email account(s). Some of the required documents may even be lost or unavailable.

In addition, filling out forms, such as online forms, can be a tedious process for users, especially when it requires filling out repetitive information each time the user avails a service, not to mention spending time looking up information from various sources before entering the information onto the form. In an exemplary scenario, if a user wishes to request two financial products from the same bank, e.g., a mortgage loan application and a credit card application, then the user would need to fill in two different forms, repeating certain information, such as name, address, account id, etc.

Additionally, the businesses would have their own internal workflows of validating the information that is provided in the application form, thereby also increasing servicing time. Since the information provided by the user is not verified, service providers spend a considerable amount of time cross-verifying the form content with supporting documents provided by the user.

SUMMARY

Related art solutions permit the Auto-filling of relevant fields retrieved from documents submitted previously. Further, some related art systems employ machine-learning techniques to automatically fill one or more fields across a diverse array of web forms. The related art systems do not solve the problem set, and instead only provide a fraction solution in each space independently. These solutions only use previously submitted information, and do not reflect a tight relationship between the form requirements and the user information. If cached information is dated, then the user would have to re-type the field content again, thereby making it least efficient and time consuming for the user. Other repository solutions as described in related concepts below, do not necessarily verify/authenticate the content that is used to fill the forms.

It may therefore be beneficial to provide a system that can reduce the time the user spends on filling forms, while ensuring that the information provided is verified and correct. The businesses therefore also do not have to rely on their back offices for determining the veracity of the form contents.

An embodiment of the present disclosure provides a method for facilitating trusted processing of a plurality of forms for use with a document banking system. The method includes receiving a selection of an Auto-fill option and at least one form from a computing device. An account holder selects the Auto-fill option displayed on the computing device. Further, the at least one form includes one or more fillable fields. The method further includes authenticating the account holder based on at least one login credential entered by the account holder at the computing device. The account holder has at least one document banking account within the document banking system. The document banking account includes at least one document associated with the account holder. The method further includes searching for a form template corresponding to the at least one form in the document banking system. The form template includes at least one fillable field similar to the one or more fillable fields of the at least one form. Further, the method includes extracting at least one value corresponding to the at least one fillable field. The at least one value being extracted from the at least one document associated with the account holder. The method also includes automatically filling the at least one form by overlaying the extracted at least one value on the one or more fillable fields of the at least one form. The filled at least one form being displayed along with a status information for each of the one or more fillable fields at the computing device.

Another embodiment of the present disclosure provides a document banking system for facilitating trusted processing of a number of forms. The document banking system includes a storage repository configured to store a number of documents associated with a number of document banking accounts. Each of the document banking accounts is associated with at least one of a number of account holders and a number of service points. A number of verification partners may verify the documents. The document banking system further includes a transceiving module configured to receive a selection of an Auto-fill option and at least one form from a computing device. An account holder may select the Auto-fill option displayed on the computing device. The at least one form includes one or more fillable fields. The document banking system also includes an authentication module is configured to authenticate the account holder based on at least one login credential entered by the account holder at the computing device. The account holder has at least one document banking account in the document banking system. The document banking account includes at least one document associated with the account holder. Further, the document banking system includes a trusted content managing module configured to search for a form template corresponding to the at least one form in the storage repository. The form template may include at least one fillable field similar to the one or more fillable fields of the at least one form. The trusted content managing module is also configured to identify the at least one fillable field of the form template which need to be filled. The trusted content managing module is also configured to extract at least one value corresponding to the at least one fillable field. The at least one value is extracted from the at least one document associated with the account holder. Further, the trusted content managing module is configured to automatically fill the at least one form by overlaying the extracted at least one value onto the one or more fillable fields of the at least one form.

Yet another embodiment of the present disclosure provides a method for facilitating trusted processing of a number of forms for use with a document banking system. The method includes receiving a selection of an "Auto-fill" option and at least one form from a computing device, wherein an account holder selects the "Auto-fill" option displayed on the computing device, the at least one form including one or more fillable fields. The method also includes authenticating the account holder based on at least one login credential entered by the account holder at the computing device. The account holder has at least one document banking account in the document banking system. The document banking account includes at least one document associated with the account holder. The method further includes searching for a form template corresponding to the at least one form in the document banking system. The form template includes at least one fillable field similar to the one or more fillable fields of the at least one form. The method also includes identifying the at least one fillable field of the form template which needs to the filled. The method further includes extracting at least one value corresponding to the at least one fillable field. The at least one value is extracted from the at least one document of the account holder. The at least one document being verified by at least one verification partner. Furthermore, the method includes automatically filling the at least one form by overlaying the extracted at least one value on the one or more fillable fields of the at least one form. The filled at least one form is displayed along with a status information for each of the one or more fillable fields at the computing device. The status information being at least one of a rigid, verified, and un-verified. The method also includes allowing the account holder to interact with the filled at least one form displayed at the computing device.

A further embodiment of the present disclosure provides a document banking system for facilitating trusted processing of a number of forms. The document banking system may include a storage repository configured to store a number of documents associated with a number of document banking accounts. The document banking accounts are associated with a number of account holders and a number of verification partners. The document banking system also includes a transceiving module configured to receive a selection of an Auto-fill option and at least one form from a computing device, wherein an account holder selects the Auto-fill option displayed on the computing device. The at least one form includes one or more fillable fields. The document banking system also comprises an authentication module configured to authenticate the account holder based on at least one login credential entered by the account holder at the computing device. The account holder has at least one document banking account in the document banking system. The document banking system may include at least one document associated with the account holder. Further, the document banking system includes a trusted content managing module configured to search for a form template corresponding to the at least one form in the storage repository. The form template includes at least one fillable field similar to the one or more fillable fields of the at least one form. The trusted content managing module is also configured to identify the at least one fillable field of the form template which need to be filled. The trusted content managing module is also configured to extract at least one value corresponding to the at least one fillable field. The at least one value is extracted from the at least one document associated with the account holder. The trusted content managing module is also configured to automatically fill the form template by overlaying the extracted at least one value on the one or more fillable fields of the at least one form. The filled at least one form is displayed along with a status information for each of the one or more fillable fields at the computing device. The status information being at least one of a rigid, verified, and un-verified.

BRIEF DESCRIPTION OF THE DRAWINGS

FIG. 5 illustrates an exemplary form, in accordance with an embodiment of the present disclosure.

FIG. 6 illustrates an exemplary machine-readable form representation, in accordance with another embodiment of the present disclosure.

FIGS. 7A-7C illustrates exemplary interfaces for Auto-filling a form, in accordance with an embodiment of the present disclosure.

DETAILED DESCRIPTION

Figure 1:
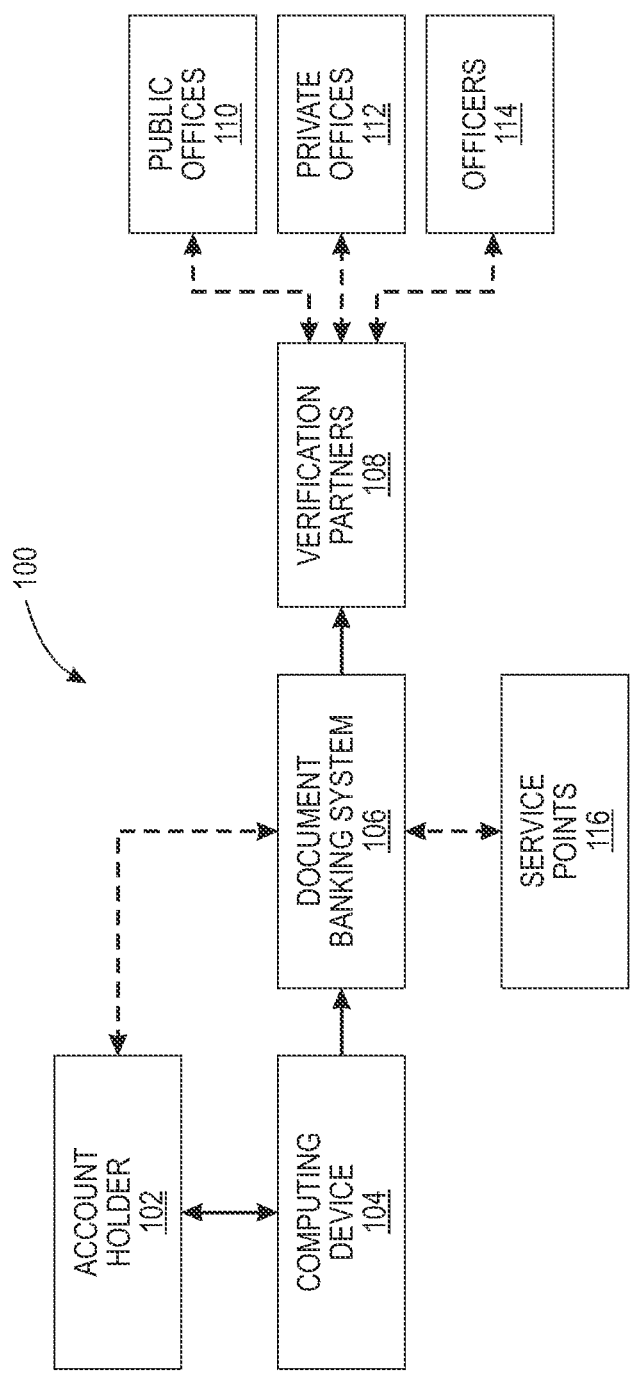
FIG. 1 is a schematic illustrating an exemplary system in accordance with an embodiment of the present disclosure.

The following detailed description is made with reference to the figures. Preferred embodiments are described to illustrate the disclosure, not to limit its scope, which is defined by the claims. Those of ordinary skill in the art will recognize a number of equivalent variations in the description that follows.

Definitions:

Definitions of one or more terms that will be used in this disclosure are described below. The term, "document banking" refers to document storage as well as trusted document transactions between one or more parties. The term "document" refers to any information such as a text, a video, an audio, a fingerprint that can be embedded inside a paper document or an electronic document, etc. Some or all of the operations of document banking are analogous to traditional banking, which stores and transacts money. The term "document transaction" refers to any activity related to documents performed in a document banking system. Examples of document transactions include, but are not limited to, opening a new document account, depositing a document in the document account, verifying a document, sending one or more documents through a gateway, sending a document periodically to a beneficiary, receiving a document from the document account, deleting a document, updating an existing document and adding an account holder to a list of beneficiaries to send documents to the account holder.

The term "transaction engine" refers to a device or a software module within the document banking system that processes all document transactions. The transaction engine may execute predefined functions corresponding to the one or more document transactions to process the corresponding document transactions. The term "billing and payment module" refers to a device or a software module within the document banking system to handle billing and payment activities. Similarly, the term "logging module" refers to a device or a software module within the document banking system to log the result of each document transaction.

The term "account holder(s)" refers to any individual or entity that maintains a document account with a document banking system. The term "storage repository" refers to any storage space available at a document banking system to store documents. Each account holder is allocated a pre-defined space within the storage repository, wherein the pre-defined space is associated with the document account of the account holder. The storage repository also stores a "profile database (DB)" to store information related to the account holders. Further, the storage repository stores documents in a predefined format, such as PDF, DOC, JPEG, MPEG, etc. The term "secure data technologies (SDT) module" refers to a device or a software module within the document banking system that secures and authenticates the documents stored in the storage repository.

As used herein, the term "verification partners" refers to individuals or organizations who have the authority to certify the veracity of documents. The verification partners include public offices (e.g., Passport and Immigration Office, Income Tax Department, Motor Vehicles Department), private offices (e.g., banks, hospitals, schools) as well as other offices or officials (e.g., gazette officers and notarization services). As used herein, the term "verification module" is a device or a software module within the document banking system that manages verification related activities at the document banking system. Once a document is verified, a "verified tag" is associated with the document.

The term "gateway" refers to a communication channel used by third parties to connect account holders with their respective document accounts with a document banking system. The term "token" refers to a unique identifier generated by third parties. In some cases, the term "token" refers to a unique identifier generated by the document banking system and sent to an account holder to confirm an action (such as deleting or modifying of a document) initiated by the account holder.

Further, a 'document banking system' may be a combination of software, hardware, firmware, or combination of these, for analyzing the conversation between different users or between a customer care agent and a number of customers. The document banking system is further intended to include or otherwise cover all software or computer programs capable of performing the various heretofore-disclosed processing of forms and documents, etc., for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

The computing devices are intended to include or otherwise cover all software or computer programs capable of performing the various heretofore-disclosed determinations, calculations, processing, etc., for the disclosed purposes. For example, exemplary embodiments are intended to cover all software or computer programs capable of enabling processors to implement the disclosed processes.

Overview:

Some disclosed embodiments generally relate to auto form filling with trusted content via a document banking system. To this end, the disclosure provides a document banking system that includes a repository for storing account holders' documents (e.g., passport, driver's license, photos and/or videos or others) in a document account, and enables account holders to transact or transfer these documents to other accounts as and/or when requested for requesting or availing one or more services. For example, an account holder can efficiently send her document(s) from her document account to an intended recipient's document account or to a service point's document banking account, e.g., a bank, a hotel, a college, and so forth. Further, the disclosed embodiments allow the account holders to auto fill one or more forms using the information or content of the pre-stored documents.

Auto filing of the forms involve authenticating the identities of the account holders, and filling the forms using the already verified information present in the pre-stored documents. This enhances or ensures integrity as well as non-repudiation in sending or receiving of document(s) across, between, or among the concerned parties. Thus, some of the disclosed embodiments relate to a method that allows automatic processing of form(s) using trusted and verified content or information from various verified documents stored in a document banking system. The disclosed systems and methods provides convenient and secure way for account holders to auto fill forms, while providing the form-processing business end with verified and trusted information.

An aspect of the disclosed system envisions a future state where any supporting document submission for verification, is eliminated in any form submission process. The document banking system stores and maintains verified and authentic documents of the account holders. One or more verification partners may verify the documents when the account holders upload them. In the document banking system, the contents of such documents are verified at the source via an API or manually. Once the contents are deemed authentic, the document banking may label the deposited documents and its contents as verified. Further, the contents may be stored in a key-value store with appropriate tags, etc. The disclosed systems and methods uses these documents for filling the forms. Hence there may not be any further requirement for verification using attached supporting documents and manning a whole back office for the same.

Some embodiments of the present disclosure allows the account holder to open an application form to apply for a service at a computing device. The account holder may click on an "Auto-fill" option displayed along with the form. The account holder may be prompted for entering login credential (a) for accessing a document banking system. The document banking system may confirm the identity of the account holder based on the login credential(s).

The disclosed systems are configured to capture a machine-readable representation of the form and store it as a form template. The system is also configured to extract all the fields for which values are needed. One or more values for the extracted fields are determined from pre-stored documents in the document banking system. The documents are verified at the time of uploading by at least one verification partner. The form is then filled by overlaying the extracted one or more values on one or more fillable fields of the form. Further, one or more status information in form of markers may be displayed to the account holder.

Exemplary Embodiments:

FIG. 1 is a schematic that illustrates an exemplary system 100, in accordance with an embodiment of the present disclosure. The system 100 includes a document banking system 106, which facilitates document transactions among various account holders registered with the document banking system 106. In an embodiment, the document banking system 106 is hosted on a server. The document banking system 106 may be software, hardware, firmware, or combination of these. In an embodiment, the document banking system 106 may be hosted on more than one server in a network. The architecture of the document banking system 106 is explained in further detail in conjunction with FIG. 3 below.

The system also includes at least one account holder 102 configured to interact with the document banking system 106. The account holder 102 may communicate with the document banking system 106 by sending or receiving one or more messages using a computing device 104. The computing device 104 can be any suitable device capable of exchanging data/messages over the network such as the Internet. Examples of the computing device 104 may include, but are not limited to, a desktop computer, a mobile phone, a tablet computer, a laptop, a personal digital assistant (PDA), a smart phone, and so forth. One or more individuals such as the account holder 102, and one or more business(es)/organization(s) such as a number of service points 116, may have document accounts with the document banking system 106. The account holder 102 and the service points 116 may access their respective document banking account by entering their specific login credential such as a user id, an account number, a password, etc. The account holder 102 may upload or download one or more documents to or from the document banking system 106. Examples of the one or more documents may include, but are not limited to, social security number (SSN), PAN, birth certificate, mark sheets, driving license, academic degrees, certificates, medical reports, and so forth.

The at least one account holder 102 and the service points 116 may register with the document banking system 106 and create a document account within the document banking system 106. After registration, the at least one account holder 102 and the service points 116 may upload or download documents to or from their respective account. Alternatively, the at least one account holder 102 and the service points 116 may download documents from a third party's account. The document banking system 106 may also provide a storage to all its registered account holders such as the at least one account holder 102 and the service points 116.

Further, the at least one account holder 102 of the document banking system 106 may interact with the document banking system 106 to perform various types of document transactions. Various example of document transactions may include, but are not limited to, opening a new document account, depositing a document in the document account, requesting a service, searching for a service, verifying a document, sending a document through a gateway, sending a document periodically to a beneficiary, receiving a document from the document account, deleting a document, updating an existing document, adding an account holder to list of beneficiaries to send documents to the account holder, etc.

As shown, the service points 116 capable of providing one or more services to the at least one account holder 102. Examples of the service points 116 may include, but are not limited to, banks, hotels, hospitals, schools, colleges, passport offices, and so forth. The services may be one or more services directly or indirectly provided to the account holder 102 by the service points 116. For example, a bank may provide services such as, opening a bank account, applying for a loan, demat service, and so forth.

A given document transaction may be any known, related art, or later developed form, such as in any one of the following forms: Consumer-To-Business (C2B), Business-To-Consumer (B2C), Consumer-To-Consumer (C2C) and Business-To-Business (B2B). An example of a C2B document transaction is an individual sending her resume to a company in order to apply for a job. An example of a B2C document transaction is a company sending a job offer to a job applicant. An example of a C2C document transaction is a house owner sending a lease agreement to the tenant. An example of a B2B document transaction is a company sending financial documents to a bank for applying for a loan. The document transactions as described here are exemplary in nature and are not intended to limit the scope of the disclosure.

The document banking system stores and maintains the documents of various account holders, such as the account holder 102, in their respective document banking account. The document banking system 106 may communicate with at least one verification partner 108 to verify documents stored in the document banking system 106. The verification partner(s) 108 includes public offices 110, private offices 112 as well as other offices or officials 114. The document banking system 106 establishes interactions with the at least one verification partner 108, either via a web-based API or manually, thereby enabling verification of any given account holder's documents.

Figure 2:
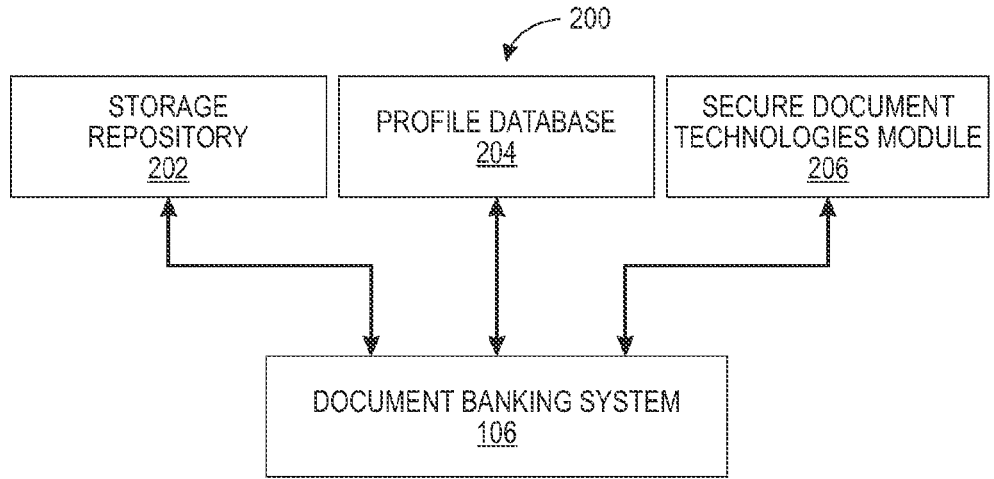
FIG. 2 is a schematic illustrating another exemplary system, in accordance with another embodiment of the present disclosure.

Further, the account holder 102 may communicate or interact with the document banking system 106 via one or more means as shown in a system 200 in FIG. 2. For example, the account holder 102 may access the one or more functionality or facilities of the document banking system by visiting a document banking branch 202. In an exemplary scenario, the account holder 102 may access the document banking system 106 via a computing device 204. In another exemplary scenario, the account holder 102 may access the document banking system 106 via a document banking ATM 206 associated with the document banking system 106.

Figure 3:
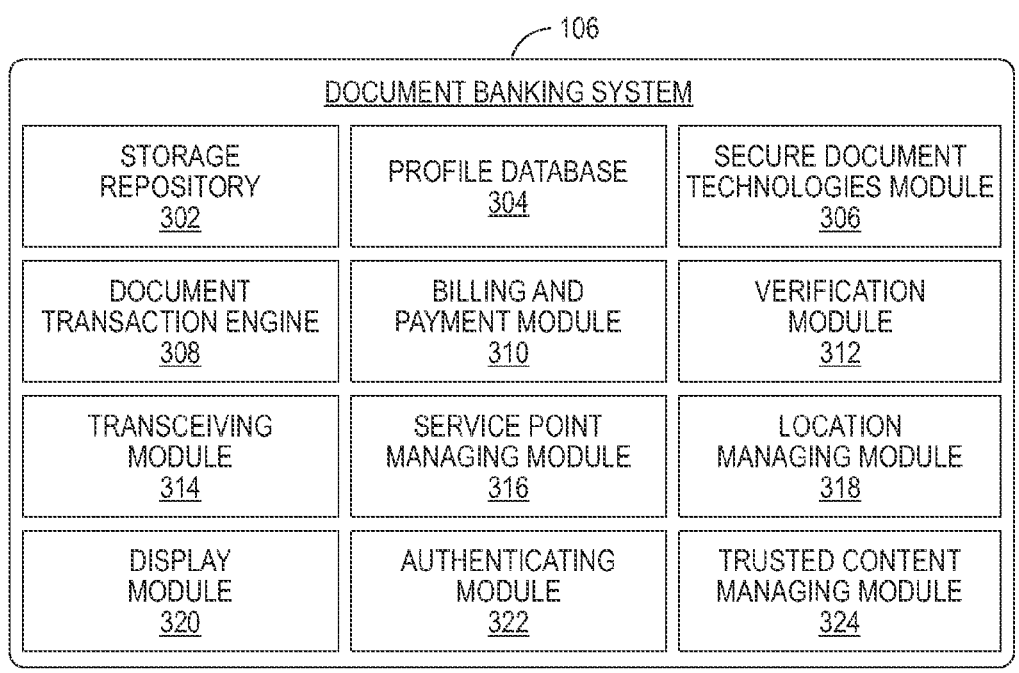
FIG. 3 is a schematic illustrating structural components of a document banking system, in accordance with an embodiment of the present disclosure.

FIG. 3 illustrates various system elements of the document banking system 106, according to an embodiment of the present disclosure. The document banking system 106 includes a storage repository 302, a profile DataBase (DB) 304, a Secure Document or data Technologies (SDT) module 306, a document transaction engine 308, a billing and payment module 310, a verification module 312, a transceiving module 314, a service point managing module 316, a location managing module 318, a display module 320, an authentication module 322, and a trusted content managing module 324. These modules interact with each other to perform and accomplish a desired task.

The transceiving module 314 is configured to allow exchange of data or information between the document banking system and the computing device 104. The account holder 102 and the service points 116 may register with the document banking system 106 and open a document banking account via a registration module (not shown). Post registration the account holder 102 may upload or download one or more documents to and from their respective document banking account with the document banking system 106. The storage repository 302 may store a number of documents associated with a number of document banking accounts. In an embodiment, the storage repository 302 may store the documents of the at least one account holder 102 (or the service points 116) in a reliable and secure manner using one or more known, related art or later developed technologies. For example, the storage repository 302 may allow access only through a firewall to enhance or ensure secure access. Further, the storage repository 302 may employ anti-spyware and anti-virus programs to enhance or ensure data integrity and security.

The storage repository 302 may further store one or more forms associated with one or more services. Each of the one or more forms may include one or more fillable fields. The service points 116 may provide the services. The storage repository 302 may also store a number of machine-readable form templates corresponding to the one or more forms. Further, the storage repository 302 may store the templates of well-known documents i.e. passport, election ID, PAN card, etc. The service points 116 may register their forms template with the document banking system 106. Registration of document/form template is a one-time exercise and all the users such as the account holder 102 and the service points 116 can use these later.

Further, as shown, the trusted content managing module 324 is configured to extract or generate a number of machine-readable form templates corresponding to a number of forms stored in the storage repository 302. The forms may be associated with one or more services provided by the service points 116. Further, the at least one form and the form template is associated with at least one service provided by at least one service point of the service points 116. The at least one service points is registered with the document banking system 106 and has at least one document banking account with the document banking system 106.

In some embodiments, the trusted content managing module 324 may capture or identify an FDL representation of the at least one form which needs to be filled (e.g., the PAN application form) and may extract all the fields for which values are needed (say K). In some embodiments, the trusted content managing module 324 is configured to search for a form template corresponding to the at least one form in the storage repository 302. The form template may include at least one fillable field similar to the one or more fillable fields of the at least one form.

The account holder 102 may fill the forms via the form templates for availing one or more services as provided by the service points 116. The service points 116 for which the forms can be filled may register the form templates with the document banking system 106. For instance, the India income tax department, as a service point registered in the document banking system 106 may register the FDL (form definition language) representation of PAN (tax ID) application form in document banking system. The FDL representation (or machine-readable form template) of PAN application then may be visible to all document banking users such as the account holder 102. It should be appreciated, that the term "FDL representation" and the "form template" are used throughout this disclosure interchangeably without changing its meaning. Further, the application form in this way may be now document banking trusted Auto-fill enabled, i.e. along this form (PAN application form), an "Auto-fill" option may be available for this form to be Auto-filled using the verified content or information or the pre-stored documents.

Further, structure of the form templates may be learned using one or more known, related art or later developed technologies. In an embodiment, the trusted content managing module 324 is configured to learn a structure of the form and generate a machine-readable form template corresponding to the form. In an exemplary scenario, the trusted content managing module 324 may generate an XML file that captures all the details about the form. Any suitable language such as, but not limited to, a form definition language (FDL), an XML schema form definition language (FDL), may be used to generate the form templates and to identify various formats of the various documents from which data is extracted as well as the new forms that need to be filled.

The trusted content managing module 324 is further configured to extract and store the content from the documents uploaded by the account holder 102 or the service points 116. The trusted content managing module 324 is configured to identify the at least one fillable fields of the form template for which values need to be filled.

Further, the trusted content managing module 324 is configured to extract at least one value corresponding to the at least one fillable fields. The at least one value may be extracted from the at least one document associated with the account holder 102. In an embodiment, the trusted content managing module 324 checks post uploading of a document, such as the passport, whether the uploaded document follows a known template or not. If yes, then the trusted content managing module 324 may perform selective optical content recognition (OCR) on specific portions of the document to extract the text corresponding to the fields associated with that portion of the document. In an embodiment, an OCR engine (not shown) may perform the selective optical content recognition. Further, the content extracted by the OCR engine may contain lot of un-necessary information. The trusted content managing module 324 may try to extract meaningful content, using one or more information retrieval techniques as well as document heuristics. In an embodiment, the meaningful information may be stored as one or more sets of entity-value pairs. The entity may represent a field as mentioned in a document or form and the value may refer to the value corresponding to that field in the stored document/form. For example, "Name" is an entity and "David" is a value for the entity "Name". In an embodiment, the storage repository 302 stores multiple values corresponding to an entity. Further, the trusted content managing module 324 may update the entity-value pairs stored in the storage repository 302 with new entity-value pairs from the document. This means, there is a new value for an existing entity, the previous value of the entity is updated with the new value in the storage repository 302.

Example of a PAN application form is mentioned for description purpose only, the disclosed methods and systems may be implemented and used for any kind of form. The form includes a number of fillable fields (herein after referred as fields). Further, the account holder 102 may click or select the Auto-fill option on the PAN application form (or at least one form). The authentication module 322 may prompt the account holder 102 to enter one or more login credential for validating the identity of the account holder 102 and his/her document banking account. Examples of the login credential may include a name, password, a user identity (ID), account number, and so forth. The login credential may be received by the transceiving module 314 of the document banking system from the computing device 104. The authentication module 322 may validate or authenticate an identity of the account holder 102 (or associated document banking account) based on the received login credential.

The trusted content managing module 324 may determine a match for the extracted fields (such as K fields) from the stored entity-value pairs in the storage repository 302. In some cases, simple pattern matching may be done for determining the match. However, in some other cases, the simple pattern matching may not work because different documents/forms can use different names for the same field or entity. For examples, DoB and Date of birth for same entity (or field) may be used in different documents or forms. The trusted content managing module 324 may utilize various available dictionaries and domain knowledge along with technologies such as Natural Language Processing (NLP), and Machine Learning (ML) to identify highly accurate entity value matches for the extracted fields. Further, if there is more than one value for an entity/field in the storage repository 302 then the display module 320 may display multiple values to the account holder 102 for selection. Further, each field may be associated or assigned with a marker or tag based on a status information. The status information may define a type of the value for the field. The type of the value (or content of the fields) or the status information may be such as, not limited to, rigid, verified, un-verified, and so forth. Further, the tag or marker may be displayed using a specific color, for example, the rigid content may be displayed using a red color, verified content/value may be displayed using a green color, and un-verified content/value may be displayed using a yellow color. In another embodiment, one or more symbols may be used along with the value to define the status information for the different fields. For example, "√" for verified content/value and "x" for un-verified content. Further, in an embodiment, the rigid content/value cannot be altered.

The rigid content is from the profile of the account holder 102. When a document banking account is opened, as in any bank account, the account holder's authenticity is verified. Thus, the profile stores information about the account holder 102. Certain parts of the information may be considered rigid, as they cannot be changed without KYC (Know-Your-Customer) norms revisit. Examples of the rigid content may include, but are not limited to, First name, Middle name/initial, Last name, Date of Birth, Social Security Number (SSN), and so forth. Due to the KYC the document banking system 106 may itself verify all these data. The account holder 102 may not be able to change or alter the rigid content on his/her own.

The verified content refers to the content extracted from verified documents. During the deposit of a document, the account holder 102 may request the authenticity of the document deposited be verified by the document banking system 106. The document may be verified by the verification partner(s) 108. If the document is verified as authentic by the issuer or the verification partner 108 of the document, then the content extracted from the verified document is classified as verified content. The document/content may be generated by an organization or a service point of the service points 116, which is registered with the document banking system 106 and its authenticity is verified, independent of the account holder 102. Further, the account holder 102 may not be able to change the verified content on his/her own. Example of the verified content may include, but not limited to, Passport number, PAN, SSN, and so forth. The un-verified content may include the content/value, which is extracted from the documents in the document banking account that are not verified or was not directly deposited by the registered organizations or service points 116.

The trusted content managing module 324 may be configured to fill the form template by overlaying the extracted at least one value on the at least one fillable fields of the at least one form (e.g., PAN application form). The filled at least one form, i.e., the filled PAN form, may be displayed along with a status information at the computing device 104. The status information is shown by marking the value of the field using a specific color or using one or more symbols. The status information shows the type of the value such as rigid content, verified content, or un-verified content.

The display module 320 is configured to display the filled at least one form and the status information of each of the one or more fields at the computing device 104. The account holder 102 may then interact with the displayed filled form (i.e., filled PAN application form). The display module 320 may display a marker or tag for each of the field value came from the Auto-fill process to represent if that field value came from at least one of a rigid, verified, or un-verified content. The display module 320 is configured to provide an interface at the computing device 104 to allow the account holder to interact with the filled at least one form. Further, the account holder 102 may accept, reject or edit these displayed values based on one or more rules as described in detail with reference to FIG. 7C.

The trusted content managing module 324 is further configured to allow the service points 116 to register their document templates along with customized rules for template usage. The trusted content managing module 324 is also configured to perform OCR on selected content of one or more forms. Further, the trusted content managing module 324 is configured to extract and create entity-value pairs used for auto filling the one or more forms as per requests received from the account holder 102. Further, the trusted content managing module 324 is configured to offer secure application programming interfaces (APIs) for the service points 116 to connect to the document banking system 106 and extract account holder related information from the storage repository 302. Furthermore, the trusted content managing module 324 is configured to auto fill forms by overlaying content on the pre-registered form templates stored in the storage repository 302.

The trusted content managing module 324 is configured to transfer the filled at least one form in the at least one document banking account of at least one service point based on one or more pre-defined rules defined by the service points 116. Further, the filled at least one form template is transferred to the at least one document banking account of the at least one service point of the service points 116 when the account holder 102 provides submit instruction at the computing device 104. In some embodiments, the filled at least one form is stored in the storage repository 302.

As shown, the profile DB 304 may store account information of the at least one account holder 102; for example, login credentials, beneficiary list and other related information. The SDT module 306 helps in authenticating the documents and storing the documents in a pre-defined format in the storage repository 302. The SDT module 306 may use one or more known, related art or later developed technologies, for example, encryption, to authenticate documents and store them in an encrypted form. The document authentication ensures that documents cannot be modified inadvertently or reduces such inadvertent modification.

The service point managing module 316 may maintain information about the service points 116 along with one or more services that the service points 116 may provide. In some embodiments, the service point managing module 316 may maintain the information using the DocR-tree data structure. The service points 116 are the registered account holders with the document banking system 106. The service point managing module 316 may also store information about spatial locations on a map of the service points 116. Further, the registration of a new service point or addition of a new service by an existing registered service point may be provided via the service point managing module 316.

The location managing module 318 maintains information about respective location of the at least one account holder with a given region-based granularity. The location managing module 318 may keep track of the respective locations of the account holder 102. For example, the granularity of the region may be 50 meters by 50 meters, or 1 Km by 1 Km, and so on. The optimal granularity to be used may depend essentially upon spatial density of the region. Further, the location managing module 318 may keep track of the locations or movements of only those users or account holders who have subscribed to this service and launched the document banking application on their device. Hence, whenever the account holder 102 launches the document banking application on his/her device, a trigger may be generated for the location managing module 318 and it may start tracking the movements of the account holder 102. The tracking may end once the account holder closes the document banking application on the device.

The at least one account holder 102 may access the document banking system 106 via a document banking application running at an associated device or via entering a universal resource locator (URL) in a browsing application at the device. The document banking application may be an interface for allowing the at least one account holder 102 to access the document banking system 106. When the document banking application is on at the device, then the location managing module 318 keeps on tracking the location of the at least one account holder 102 in real time. The location managing module 318 may stop tracking the location of the at least one account holder 102 when the document banking application is closed on the device.

The document transaction engine 308 may facilitate one or more document transactions among various parties including the at least one account holder 102, the service points 116, the at least one verification partner 108, third parties, etc. The transaction engine 308 may also process the received at least one service request. The transaction engine 308 may also identify at least one service point from the multiple service point based on the at least one service request and/or the respective location of the at least one account holder 102. The at least one of the service points 116 is capable of providing the service requested in the service request. The transaction engine 308 may also add at least one document required for processing the service request in a document transfer queue of the at least one of the service points 116. The document transaction engine 308 may also generate and provide a reference number to the at least one account holder 102. Further, based on one or more rules or predefined conditions as specified by the at least one of the service points, the transaction engine may transfer the at least one document to an account of the at least one of the service points 116. The transfer of the at least one document may be initiated based on the rules. Further, the transaction engine 308 may manage and supervise the at least one document transaction occurring in the mobile settings of a mobile device, for example.

Further, the display module 320 may display content or information to the user. For example, the display module 320 may display the at least one of the service points 116 along with the associated services and other information including one or more service options to the at least one account holder 102. The service options may be an option to allow the at least one account holder 102 to download a copy of the documents, or to add the documents to a document transfer queue of the at least one of the service points 116. The display module 320 is also configured to display the filled forms and form templates to the account holder 102.

In some scenarios, the at least one account holder 102 may need to visit a branch office of the at least one of the service points 116 for further verification. The documents may only be transferred from the document transfer queue to the document banking account of the at least one of the service points 116 after verification.

The billing and payment module 310 handles billing related activities associated with the one or more document transactions. When or if requested, the verification module 312 performs verification of the documents, either manually or via a web-based API. The verification module 312 may verify the uploaded document with the help of various verification partner(s) 108 as shown in FIG. 1.

The document banking system 106 may also include a notification module (not shown) to notify the at least one account holder 102 of account activity related to one or more document transactions. Moreover, the document banking system 106 includes a logging module (not shown) to log information related to all activities performed on the document banking system 106. The logged information may be used to perform system performance analytics to facilitate reasonable document transaction response times as well as system scalability with respect to a large and/or growing number of account holders and an increasingly large number of transactions. The statistics obtained by the performance analytics may include average time taken for different types of transactions, most frequently requested transactions, etc. The obtained statistics may be available to the document banking system 106 so that it may take corrective actions to maintain reasonable system performance. In some embodiments, the document banking system 106 may also include a scanner to scan documents and a printer to print documents.

In an exemplary embodiment, the at least one account holder 102 logs into the document banking system 106. The document banking system 106 uses the profile DB 304 to verify the login credentials of the at least one account holder 102 before the at least one account holder 102 is allowed to access the document account at the document banking system 106. Thereafter, the at least one account holder 102 initiates a document transaction, such as a deposit document transaction, and sends a document to the document transaction engine 308. The document transaction engine 308 processes the deposit document transaction as per the predefined functionality. Thereafter, the SDT module 306 authenticates the document sent by the at least one account holder 102 and stores an encrypted copy of the document in the storage repository 302. In some embodiments, the billing and payment module 310 updates billing information for the at least one account holder 102 based on the type of the document transaction.

In cases where the at least one account holder 102 initiates a request for verifying a document, the verification module 312 identifies a relevant verification partner, in the at least one verification partner 108, to verify the document. If successfully verified, the verification module 312 sets a "verified tag" associated with the document to "TRUE". Finally, the billing and payment module 310 updates billing information for the at least one account holder 102 based on the verified document transaction.

Figure 4A:
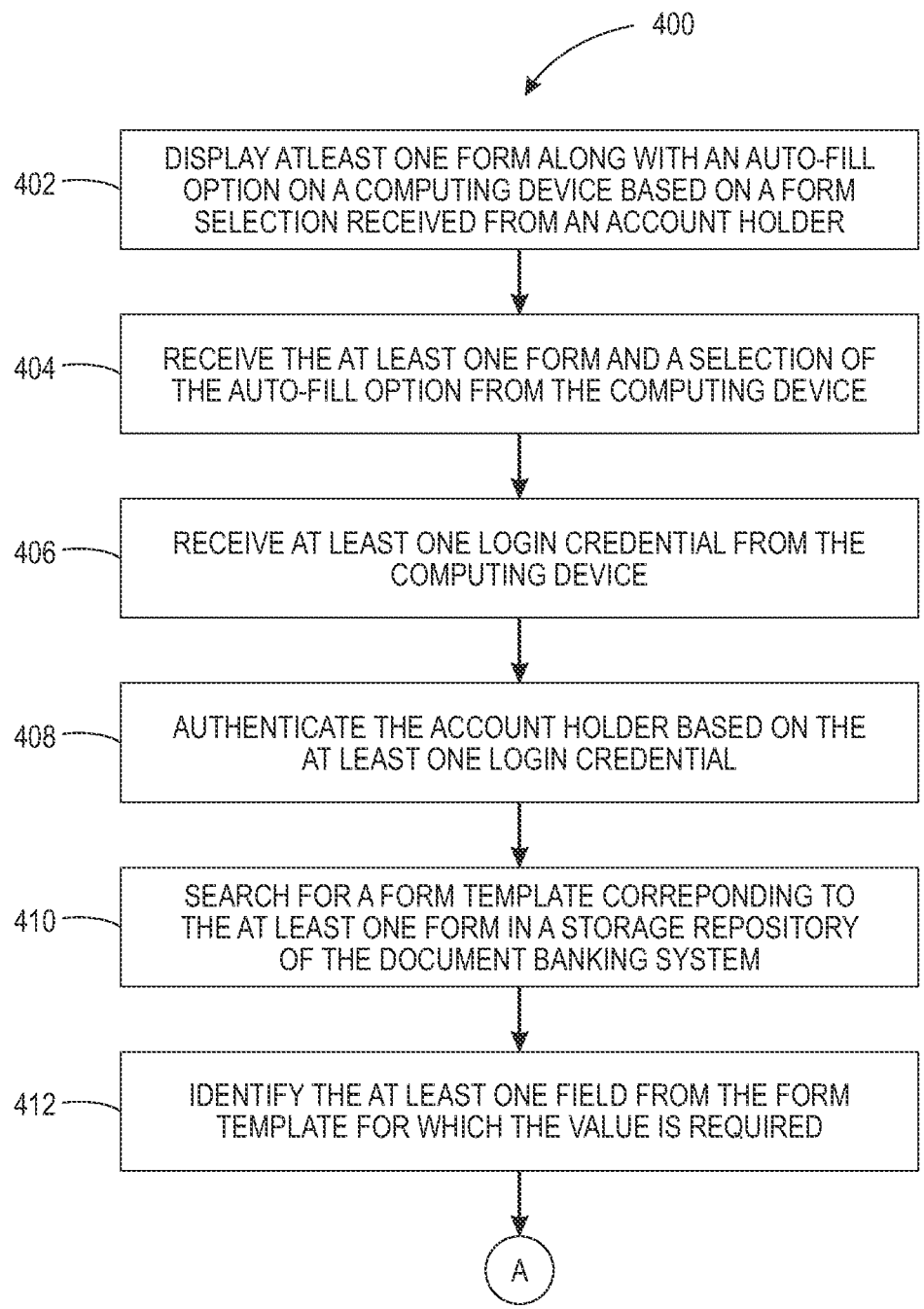
FIGS. 4A-4B is a flowchart illustrating a method for facilitating trusted processing of a plurality of forms via a document banking system, in accordance with an embodiment of the present disclosure.
Figure 4B:
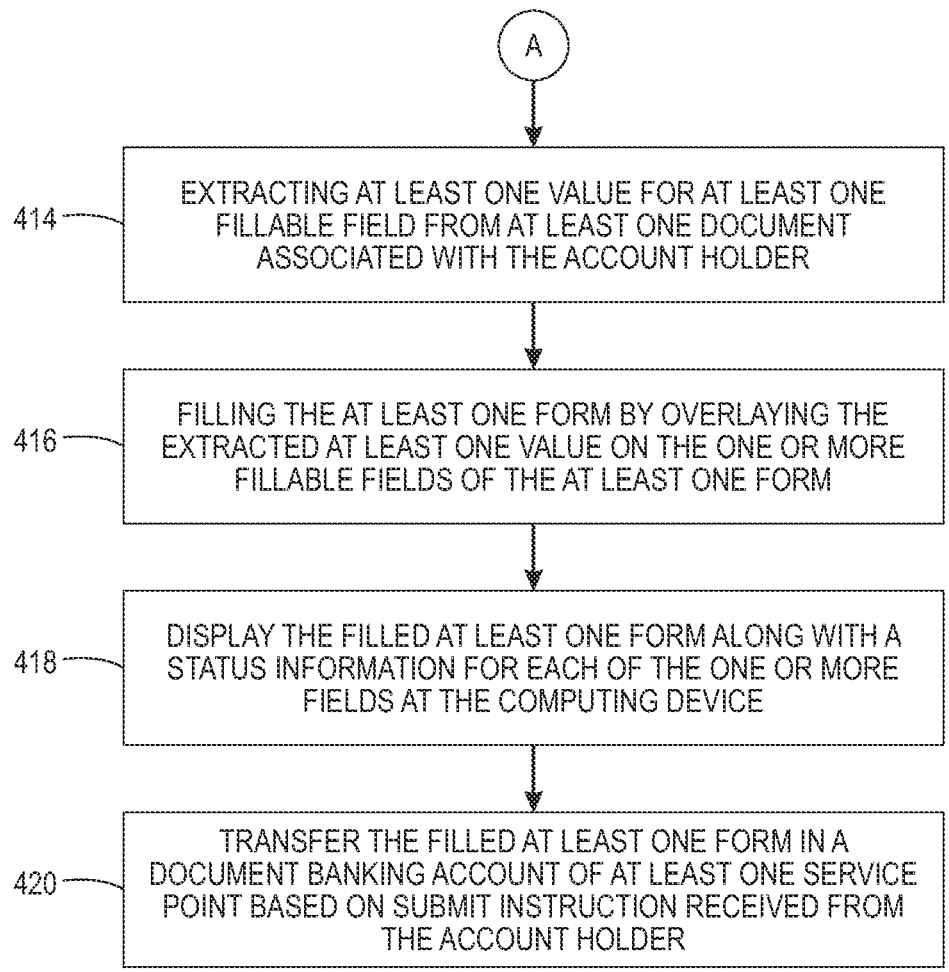

FIGS. 4A-4B is a flowchart illustrating a method for facilitating trusted processing of a plurality of forms via a document banking system, in accordance with an embodiment of the present disclosure. As discussed with reference to FIGS. 1-3. The account holder 102 is a registered user of the document banking system 106. The computing device 104 is configured to communicate with the document banking system 106. The service may be provided by the at least one of the service points 116 which is also registered with the document banking system 106. The account holder 102 may open a form for availing one or more service at the computing device 104. The form is a registered form. An "Auto-fill" option is also displayed along with the form at the computing device 104 of the account holder 102.

At step 402, at least one form along with an Auto-fill option is displayed on the computing device 104 based on a form selection received from the account holder 102. The at least one form may be an application form for applying for a service such as loan. The account holder 102 may select the Auto-fill option displayed on the computing device 104. In an embodiment, the display module 320 displays the form and the Auto-fill option at the computing device 104. At step 404, the at least one form and the selection of the Auto-fill option is received at the document banking system 106. In an embodiment, the transceiving module 314 receives the form and the selection of the Auto-fill option from the computing device 104. The account holder 102 at the computing device 104 may be prompted to enter at least one login credential to allow access to the document banking system 106.

At step 406, the at least one login credential is received from the computing device 104. Examples of the login credential may include, but not limited to, a user name, a user ID, a password, an account ID, an account number, and so forth. The transceiving module 314 may receive the at least one login credential from the computing device 104. Then at step 408, account holder 102 is authenticated based on the received at least one login credential. In an embodiment, the authentication module 322 may authenticate and validate an identity of the account holder 102 (or of the document banking account associated with the account holder 102).

At step 410, a form template corresponding to the at least one form is searched at the document banking system 106. The form template includes at least one field similar to the one or more fields of the at least one form. As discussed with reference to FIG. 2, the storage repository 302 stores a number of documents, forms, and form templates. The trusted content managing module 324 may search for the form template corresponding to the at least one form in the storage repository 302. Then at step 412, at least one field is identified from the form template for which the value is required. In some embodiments, the trusted content managing module 324 identifies the at least one field from the form template.

Thereafter at step 414, at least one value for the at least one field is extracted from at least one document associated with the account holder 102. The trusted content managing module 324 may identify the at least one document from the storage repository 302. The trusted content managing module 324 may then extract at least one value for the at least one field from the identified at least one document. In some embodiments, more than one value for the at least one fields is extracted. Then at step 416, the at least one form is filled automatically by overlaying the extracted at least one value on the one or more fillable fields of the at least one form. In some embodiments, the trusted content managing module 324 automatically fills the at least one form. Further at step 418, the filled at least one form along with a status information for each of the one or more fields is displayed at the computing device 104. In some embodiments, the display module 320 displays the filled at least one form at the computing device 104. The status information may define the type of the content or value for each of the one or more fields. For example, the value may be rigid, verified, and un-verified. The account holder 102 is allowed to interact with the displayed filled at least one form. The account holder 102 may select or reject the values filled for the one or more fields. When the account holder is done with the selection or rejection of the form, the account holder 102 may choose to submit the filled at least one form. At step 420, based on the submission instruction from the account holder 102, the filled at least one form is transferred in a document banking account of at least one service point of the service points 116. In some embodiments, the action to be taken post receiving the submission instruction from the account holder is governed by or based on one or more rules defined by the at least one service point. For example, on submission, the filled at least one form may be transferred in the document banking account of the at least one of the service points 116 or may be transferred to the storage repository 302.

Figure 5:
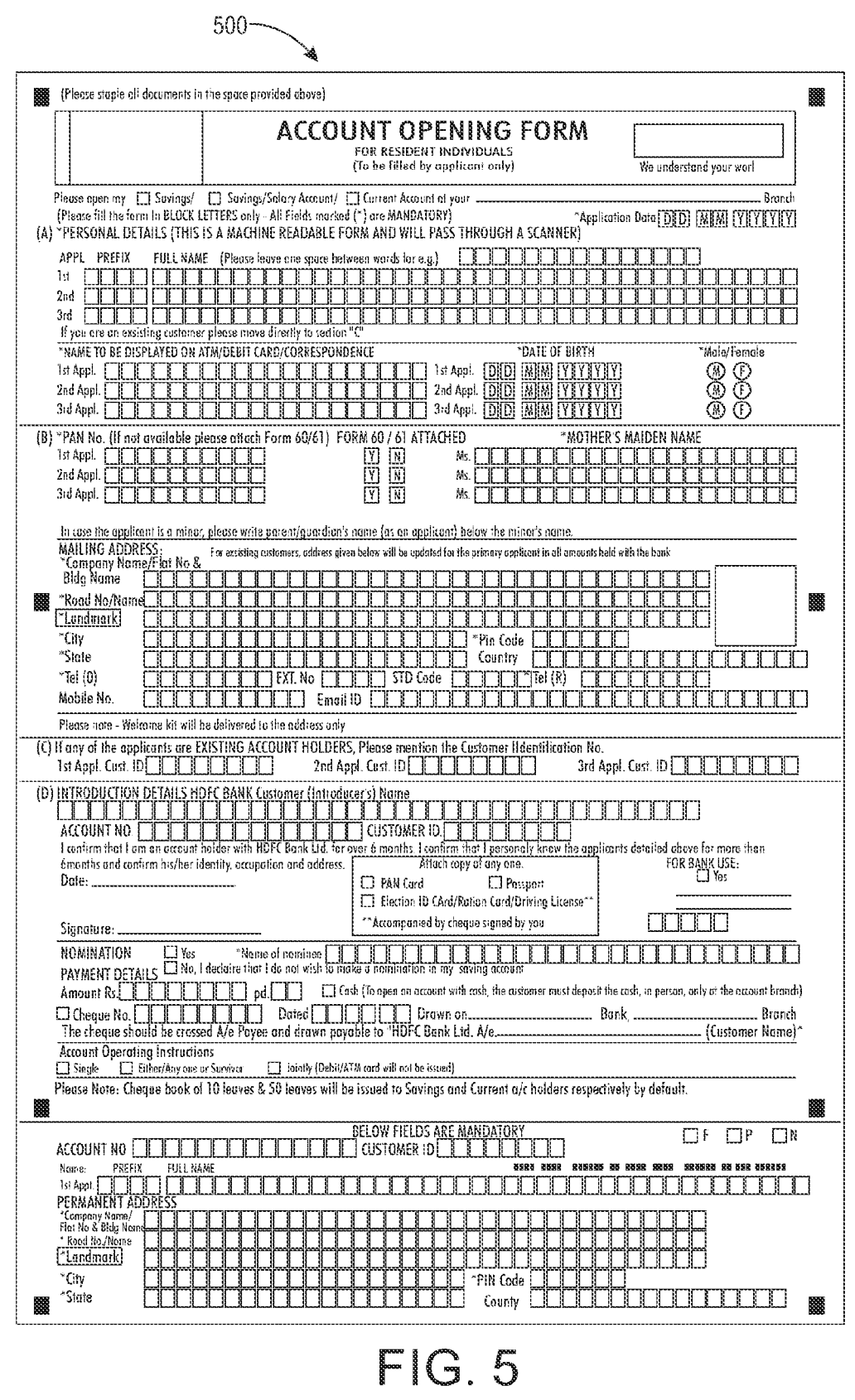

FIG. 5 illustrates an exemplary form 500, in accordance with an embodiment of the present disclosure. As shown, the form 500 may include a number of fillable fields. Examples of the one or more fillable fields may include, but are not limited to, first name, last name, phone number, date of birth, and so forth.

FIG. 6 illustrates an exemplary machine-readable form representation or a form template 600, in accordance with another embodiment of the present disclosure. The account holder 102 may fill the forms via the form templates such as the form template 600 for availing one or more services that may be provided by the service points 116. The service points 116 for which the forms can be filled may register the form templates with the document banking system 106. For instance, the India income tax department, as a service point registered in the document banking system 106 may register the FDL (form definition language) representation of a PAN (tax ID) application form in the document banking system 106. The FDL representation (or machine-readable form template) of PAN application then may be visible to all document banking users such as the account holder 102. It should be appreciated, that the term "FDL representation" and the "form template" are used throughout this disclosure interchangeably without changing its meaning. Further, the application form in this way may be now document banking trusted Auto-fill enabled, i.e. along this form (PAN application form), an "Auto-fill" option may be available for this form to be Auto-filled using the verified content or information or the pre-stored documents.

The trusted content managing module 324 may be configured to extract or generate a number of machine-readable form templates corresponding to a number of forms stored in the storage repository 302. The forms may be associated with one or more services provided by the service points 116. Further, the at least one form and the form template is associated with at least one service provided by at least one service point of the service points 116. Further, structure of the form templates may be learned using one or more known, related art or later developed technologies. In an embodiment, the trusted content managing module 324 is configured to learn a structure of the form and generate a machine-readable form template corresponding to the form. In an exemplary scenario, the trusted content managing module 324 may generate an XML file that captures all the details about the form. Any suitable language such as, but not limited to, a form definition language (FDL), an XML schema form definition language (FDL), may be used to generate the form templates and to identify various formats of the various documents from which data is extracted as well as the new forms that need to be filled.

Figure 7B:
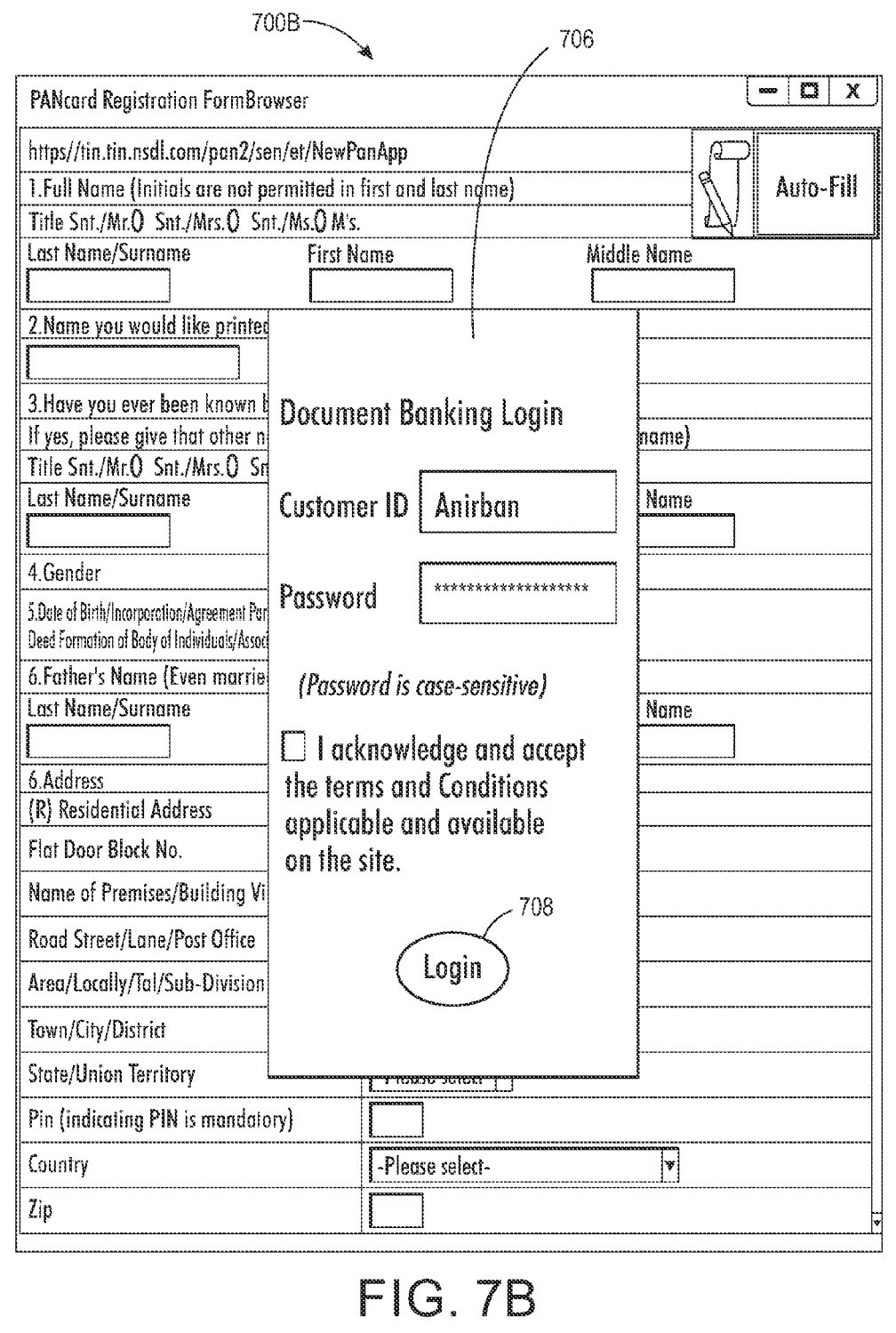

FIGS. 7A-7C illustrates exemplary interfaces 700A-700C, respectively, for Auto-filling a form, in accordance with an embodiment of the present disclosure. As discussed with reference to FIGS. 1 and 2, the account holder 102 may select and open a form at the computing device 104. As shown in interface 700A, a form 702 is opened by the account holder 102. Further, when the form is registered with the document banking system 106 or belongs to a service provided by at least one of the registered service point 116, then an "Auto-fill" option 704 is also displayed along with the form. The account holder 102 may opt to auto fill the form by selecting the "Auto-fill" option 704.

When the account holder 102 selects the "Auto-fill" option 704, then as shown on the interface 700B, a window 706 having one or more login credential fields may be displayed on the computing device 104. The account holder 102 may enter the login credential(s) in the login credential fields of the window 706. After entering the login credential(s), the account holder 102 may select a login option 708 as shown in the window 706.

Once the account holder 102 is authenticated by the authentication module 322 of the document banking system 106, the trusted content managing module 324 may fill the form 702 automatically. The interface 700C displays a filled form 710 with status information for each of the one or more fields. The status information is shown as markers 712 using different colors (such as green, red, etc.) and/or symbols (such as '√', 'x', etc.).

As shown in FIG. 7C, the account holder 102 may interact with individual field (i.e., Auto-filled field) as per the following rules based on the content, as follows:

(i) The rigid content cannot be changed. If the account holder 102 rejects the rigid content then the whole form fill may be rejected. The rigid content may be collected as per KYC norms, and rejecting the rigid content may imply rejection of the document banking account details of the account holder, which in turn may result in that document banking system is not being liable for any other content.
(ii) If a verified content is edited by the account holder 102 (or someone else) then the field value is immediately classified as un-verified.
(iii) The un-verified content is editable and the account holder 102 can edit this content as required.
(iv) If more than two values are presented for a fields then the account holder 102 can choose one of them, but the content is always considered as un-verified content.

In an exemplary scenario, when all the content in the filled form is verified or is rigid content, then the account holder 102 may choose to submit the filled form. The trusted content managing module 324 may execute the submission of the form according to one or more rules defined by a service point of the service points 116. The rules may include transfer of the filled form in a document banking account of the associated service point or in the storage repository 302. In such scenario, no back office processing by the service point is required.

In another exemplary scenario, when the content in the filled form is partially un-verified, then the service point may ask for a few of the whole set of supporting documents to be attached to have a partial back office work at the service point office. In yet another exemplary scenario, when the content is all un-verified in the filled form, the consumer or the account holder 102 may still have to dedicate less effort or time, while the back office of the service point (116) may still continue performing its content validation process.

An aspect of the present disclosure allows to auto fill a form using existing verified (or un-verified) content from the pre-stored documents of the account holder.

A further aspect of the present disclosure allows various service points to register their form or document template along with customized rules for template usage.

Another aspect of the present disclosure performs optical character recognition for extracting content from the pre-stored documents.

A yet another aspect of the present disclosure offers secure APIs for the service points to connect with document banking system and extract user related information (such as, of the various account holder and service points) from the storage repository. The storage repository may store the user related information in form of entity-value pairs.

It will be understood that the modules and the databases referred to in the previous sections are not necessarily utilized together in a single conversation analyzing system. Rather, these modules are merely exemplary of the various modules that may be implemented within a conversation analyzing system. Further, it will be understood that the conversation analyzing module may include more modules than the ones described in this disclosure without departing from the scope of the present disclosure.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A document banking system for processing a service application with a registered service provider, the document banking comprising:
   a) a storage repository configured, at least in part, to:
      store a plurality of verified documents in machine readable form; and
      store machine readable form templates each having at least one fillable field;
   b) a verification module configured, at least in part, to:
      verify an account holder documents with any of a plurality of verification partners;
      associate a verified tag with each document verified by at least one verification partner; and
      store verified documents to the storage repository in machine readable form;
   c) a transceiving module comprising a display module configured, at least in part, to:
      enable an account holder to selectively open an application for a service provided by one of a plurality of service points, each service point having an account with the document banking system;
      display a form template associated with the service; and
      display a selectable Auto-fill option with the displayed form template, each Auto-fill option being displayed with an associated status of either rigid, verified, or un-verified; and
   d) a trusted content managing module configured, at least in part, to:
      identify fillable fields of the displayed form template which can be automatically filled-in;
      extract values corresponding to the identified fillable fields from at least one of the account holder's verified documents stored in the storage repository;
      fill the extracted values into the associated fillable fields;
      receive an account holder's further input into at least one of the fillable fields;
      in response to the associated status of the received account holder's further input being one of:
         rigid then rejecting the entire document,
         verified then accepting the received account holder's further input and changing the associated status to un-verified, and
         un-verified then accepting the received account holder's further input and maintaining the associated status as un-verified; and
      transfer, in response to a submit instruction from the account holder, the filled-in form to the account of the service point providing the selected service according to rules defined by a service point.

2. The system of claim 1, wherein the trusted content managing module is further configured to transfer supporting documents to the account of the service point providing the selected service.

3. The system of claim 1, wherein the transceiving module is further configured to enable the account holder to provide a submit instruction.

4. The system of claim 1, further comprising an authentication module configured, at least in part, to:
   receive the account holder's login credentials; and
   authenticate the account holder based on the received login credentials.

5. The document banking system of claim 1, wherein the trusted content managing module is further configured to generate and store a plurality of form templates corresponding to the plurality of forms associated with one or more services, the one or more service being provided by the plurality of service points.

6. The document banking system of claim 1, wherein the trusted content managing module is further configured to transfer the filled at least one form and one or more supporting documents based on a pre-defined one or more rules.

* * * * *